United States Patent Office 3,121,081
Patented Feb. 11, 1964

3,121,081
6-AMINO-7,8-DICYANOPYRROLO [b]-AS-TRIAZINES AND 7 - AMINO - 8,9 - DICYANOPYRROLO [b]-[1.2.4]TRIAZEPINES AND THEIR PREPARATION
Clifford Lee Dickinson, Jr., Wilmington, Del., assignor to E. I. du Pont de Nemours and Company, Wilmington, Del., a corporation of Delaware
No Drawing. Filed Aug. 18, 1961, Ser. No. 132,281
12 Claims. (Cl. 260—240)

This invention relates to a new class of pyrrolotriazines and pyrrolotriazepines and a process for their preparation.

This application is a continuation-in-part of my co-pending application U.S. Serial No. 711,155, filed January 27, 1958, now abandoned.

The discovery of 3,4-dicyano-1,2,5-triaminopyrrole and its preparation by the reaction of tetracyanoethane with hydrazine, which is fully described and claimed in U.S. Patent 2,961,447, has made available a new starting material for chemical synthesis. For example, it has been shown therein that 3,4-dicyano-1,2,5-triaminopyrrole reacts wtih monocarbonyl compounds to yield 1-, bis-1,2- and tris-1,2,5-ylideneamino derivatives.

I have now found that when 3,4-dicyano-1,2,5-triaminopyrrole is reacted with vicinal and 1,3-dicarbonyl compounds, there are obtained respectively the corresponding 6-amino-7,8-dicyanopyrrolo [b]-as-triazines and 7-amino-8,9-dicyanopyrrolo [b] [1.2.4]triazepines.

The formation of the new compounds of this invention can be illustrated as follows:

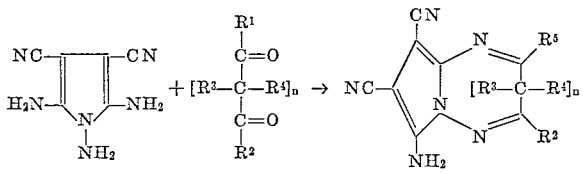

wherein $R^1$ is a member of the group consisting of hydrogen, hydrocarbyl, hydrocarbyloxy, and halogen; $R^2$ is a member of the group consisting of hydrogen, hydrocarbyl, and halogen; $R^3$ and $R^4$ can be the same or different and represent a member of the class consisting of hydrogen and hydrocarbyl groups; $R^5$ is a member of the group consisting of hydrogen, hydrocarbyl, hydroxy and halogen; and $n$ is 0 or 1. It will be understood that by the term hydrocarbyl is meant an organic radical composed of carbon and hydrogen, including alkyl, aralkyl, and aryl radicals, and that the preferred hydrocarbyl and hydrocarbyloxy groups are those in which the hydrocarbyl radical is aliphatically saturated as in butyl, dodecyl, octadecyl, benzyl and rubryl or aliphatically monounsaturated as in allyl, vinyl, 9,10-octadecenyl and cyclohexenyl.

"Hydrocarbyl" is used in its accepted meaning as representing a radical formed from a hydrocarbon by removal of a hydrogen atom. The hydrocarbyl groups represented above can be any radical composed solely of carbon and hydrogen as long as it is aliphatically saturated or contains no more than one unit of aliphatic carbon-to-carbon unsaturation. The wide variation in the hydrocarbyl groups used in the illustrations which follow makes it evident that all hydrocarbyl groups of the above types are operable. These hydrocarbyl groups may vary as to whether they are alkyl, cycloalkyl, aryl, aralkyl, alkaryl, single ring, multi ring, aliphatically saturated, aliphatically monounsaturated, straight chain, branched chain, large, small and the like. The widest variation of this sort does not in any way detract from the fundamental characteristic of the hydrocarbyl radical of passing unchanged through the process of this invention and exercising no effect whatever on the chemical steps of the process. Representative hydrocarbyl groups include methyl, tert-butyl, isooctyl, dodecyl, octadecyl, eicosyl, vinyl, propenyl, styryl, 9,10-octadecenyl, picyl, phenanthryl, cyclopropyl, cyclobutyl, cyclohexyl, cyclooctyl, phenyl, naphthyl, anthryl, rubryl, benzyl, phenethyl, duryl, 4-isopropylnaphthyl, chrysyl, and the like.

The limitations of space for disclosure are not to be construed as any limitation within the scope of "hydrocarbyl" contemplated in this invention. Even the most cumbersome hydrocarbyl radicals such as those obtained by removing end groups from high molecular weight hydrocarbon polymer molecules containing thousands of carbon atoms, such as polyethylene, polyisobutylene, polystyrene, and the like, are fully operable.

It is obvious that hydrocarbyl groups of the above types containing 20 or fewer carbon atoms are most available, and to that extent preferred. But there is to be no question of the operability of, or of the intent to include and disclose, any hydrocarbyl group of the above types whatsoever.

Vicinal dicarbonyl compounds which react with 3,4-dicyano-1,2,5-triaminopyrrole to yield the 6-amino-7,8-dicyanopyrrole [b]-as-triazines of the present invention include glyoxal, biacetyl, benzyl, phenylglyoxal, cyclohexylglyoxal, oxalyl chloride, oxalyl bromide, ethyl oxalyl chloride ($C_2H_5OOCCOCl$) and esters, e.g., the ethyl and butyl esters, of the following acids: glyoxylic acid, phenylglyoxylic acid, $\alpha$- and $\beta$-naphthylglyoxylic acid, pyruvic acid, phenylpyruvic acid, $\alpha$-ketovaleric acid, $\alpha$-keto-$\delta$-phenylvaleric acid and the like.

1,3-dicarbonyl compounds which react with 3,4-dicyano-1,2,5-triaminopyrrole to yield 7-amino-8,9-dicyanopyrrolo[b] [1.2.4]triazepines of the invention include malonaldehyde, acetylacetone, benzoylacetone, 3-formyl-2-butanone, malonyl chloride, esters of acetoacetic acid, benzoylacetic acid and the like.

The process of this invention, that is the reaction of 3,4-dicyano-1,2,5-triaminopyrrole with dicarbonyl compounds, takes place spontaneously at room temperature. Temperatures above and below room temperature such as from 0° to 300° C. may be employed. To bring the reaction to completion in a reasonable length of time, moderate heating in the range of 50–150° C. is preferred.

The molar proportion of the reactants employed in preparing the novel compounds of this invention is not critical, and wide variations may be used. However, molar proportions in the range 2:1 to 1:2 are generally preferred; and, for most economical operations, molar ratios close to 1:1 are particularly preferred.

As illustrated in Example III which follows, the use of a catalyst is not essential. However, the reaction is catalyzed by acid catalysts such as hydrogen chloride, p-toluenesulfonic acid or benzoic acid and the use of such a catalyst is preferred. The use of a reaction medium inert to the reactants and products is preferred as a means for dissipating the heat of reaction but is not essential to the reaction. Illustrative of the media which can be employed are dimethylformamide, dimethylsulfoxide, and tetramethylenesulfone.

The 6-amino-7,8-dicyanopyrrolo[b]-as-triazines and 7-amino-8,9-dicyanopyrrolo[b][1.2.4]triazepines of this invention can be reacted further at their respective amino groups with aldehydes and ketones to yield the corresponding N-alkylidene derivatives. Typical reactions of this type involving 6-amino-7,8-dicyanopyrrolo[b]-as-triazines are shown in Examples IV and V. In a similar manner, 7-amino-8,9-dicyanopyrrolo[b][1.2.4]triazepine reacts with benzaldehyde to yield 7-benzalamino-8,9-dicyanopyrrolo[b][1.2.4]triazepine. Aldehydes such as formaldehyde, acetaldehyde, propionaldehyde, butyraldehyde, pivalaldehyde, stearaldehyde, p-tolualdehyde, phenylacetaldehyde, 1-naphthaldehyde, 2-naphthaldehyde and the like, and ketones such as acetone, methyl ethyl ketone, methyl tertiary butyl ketone, stearone, cyclopentanone, cyclohexanone, acetophenone, benzophenone, cyclobutyl phenyl ketone, anthrone, benzyl 1-naphthyl ketone and the like, can be substituted for benzaldehyde in these reactions to yield the corresponding N-alkylidene derivatives. The conditions for carrying out these reactions are the same as those described above for the reaction of 3,4-dicyano-1,2,5-triaminopyrrole with dicarbonyl compounds.

The N-alkylidene derivatives of my novel triazines and triazepines are colored compounds, as are the novel triazines themselves, and find use as dyes. More will be said later about the utility of the products of this invention.

In the following examples parts are by weight. Example I illustrates a preferred embodiment of this invention.

EXAMPLE I

*6-Amino-7,8-Dicyano-2,3-Dimethylpyrrolo[b]-As-Triazine*

A solution of 324 parts of 3,4-dicyano-1,2,5-triaminopyrrole, 172 parts of biacetyl and 20 parts of p-toluenesulfonic acid in a mixture of 1900 parts of dimethylformamide and 1100 parts of ethanol is heated at 100° C. for a period of 4 hours and allowed to cool. 6-amino-7,8-dicyano-2,3-dimethylpyrrolo[b]-as-triazine separates as an orange precipitate. It is collected by filtration and washed with ethanol; yield 110 parts. The filtrate is diluted with 7900 parts of denatured ethanol, and the resulting precipitate of 6-amino-7,8-dicyano-2,3-dimethylpyrrolo[b]-as-triazine is collected; yield 175 parts. The combined yield is 285 parts (66%). Recrystallization from acetic acid gives orange crystals, M.P. 276–278° C. (dec.).

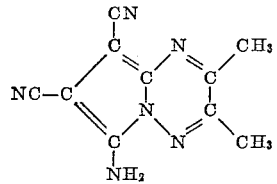

*Analysis.*—Calc'd. for $C_{10}H_8N_6$: C, 56.60; H, 3.77; N, 39.64. Found: C, 56.86, 57.09; H, 3.97, 4.16; N, 40.29, 40.59.

EXAMPLE II

*6-Amino-7,8-Dicyano-2,3-Diphenylpyrrolo[b]-As-Triazine*

A solution of 486 parts of 3,4-dicyano-1,2,5-triaminopyrrole, 610 parts of benzil and 100 parts of p-toluenesulfonic acid is heated at 100° C. for 5 hours. During this time, deep red crystals of 6-amino-7,8-dicyano-2,3-diphenylpyrrolo[b]-as-triazine form. The mixture is cooled, diluted with 10,000 parts of water, filtered and the crystals washed thoroughly with ethanol; yield 900 parts (90%), M.P. slightly greater than 300° C. A sample recrystallized from acetic acid shows the following analysis.

*Analysis.*—Calc'd. for $C_{20}H_{12}N_6$: C, 71.43; H, 3.57; N, 25.00. Found: C, 71.20, 71.57; H, 3.68, 3.88; N, 25.43, 25.06.

EXAMPLE III

*6-Amino-7,8-Dicyano-2(3)-Hydroxy-3(2)-Methyl-pyrrolo[b]-As-Triazine*

A solution of 322 parts of 3,4-dicyano-1,2,5-triaminopyrrole and 232 parts of ethyl pyruvate in a mixture of 947 parts of dimethylformamide and 789 parts of ethanol is heated under reflux. A solid begins to separate after 1 hour, and after 2 hours the mixture is cooled. The orange solid is collected and washed thoroughly with ethanol; yield 250 parts (55%) of 6-amino-7,8-dicyano-2(3)-hydroxy-3(2)-methylpyrrolo[b]-as-triazine, M.P. >300° C. A sample recrystallized from dimethylformamide-ethanol shows the following analysis.

*Analysis.*—Calc'd. for $C_9H_6ON_6$: C, 50.47; H, 2.80; N, 39.25. Found: C, 50.49, 50.63; H, 3.24, 3.47; N, 39.45, 39.10.

EXAMPLE IV

*6-Benzalamino-7,8-Dicyano-2,3-Dimethylpyrrolo[b]-As-Triazine*

A mixture of 212 parts of 6-amino-7,8-dicyano-2,3-dimethylpyrrolo[b]-as-triazine, 1050 parts of benzaldehyde and 30 parts of p-toluenesulfonic acid is heated at 160° C. for 1.5 hours and then allowed to cool. Ethanol (1100 parts) is added and the magenta solid which separates is collected. This solid is heated with 4400 parts of benzene to remove the benzaldehyde and again collected; yield 275 parts (91%) of 6-benzalamino-7,8-dicyano-2,3-dimethylpyrrolo[b]-as-triazine, M.P. 260–265° C. Recrystallization from acetic acid gives a magenta product with a greenish cast that melts at 263–265° C.

*Analysis.*—Calc'd. for $C_{17}H_{12}N_6$: C, 68.00; H, 4.00; N, 28.00. Found: C, 67.60, 67.34; H. 4.30, 4.15; N, 27.82, 27.21.

EXAMPLE V

*6-Benzalamino-7,8-Dicyano-2,3-Diphenylpyrrolo[b]-As-Triazine*

A mixture of 200 parts of 6-amino-7,8-dicyano-2,3-diphenylpyrrolo[b]-as-triazine, 440 parts of benzaldehyde and 30 parts of p-toluenesulfonic acid is heated at 150–160° C. for 2 hours and then allowed to cool. Ethanol (1100 parts) is added and the orange crystalline solid is collected; yield 170 parts (67%) of 6-benzalamino-7,8-dicyano-2,3-diphenylpyrrolo[b]-as-triazine, M.P. 276–277° C. A sample recrystallized from dimethylformamide-ethanol shows the following analysis:

*Analysis.*—Calc'd. for $C_{27}H_{16}N_6$: C, 76.41; H, 3.77; N, 19.81. Found: C, 76.25, 76.30; H, 4.00, 3.94; N, 20.64, 20.81.

EXAMPLE VI

*6-Amino-7,8-Dicyanopyrrolo[b]-As-Triazine*

To a solution of 80 parts of 3,4-dicyano-1,2,5-triaminopyrrole in 236 parts of dimethylformamide there is added 100 parts of 30% glyoxal solution in water and 5 parts of p-toluenesulfonic acid. The solution is heated at 100° C. for four hours, then cooled, diluted with 987 parts of ethanol and filtered. The solid is collected; yield 75 parts of 6-amino-7,8-dicyanopyrrolo[b]-as-triazine, M.P. 281–285° C. dec. Recrystallization from acetic acid gives a deep red solid melting at 288–290° C.

*Analysis.*—Calc'd. for $C_8H_4N_6$: C, 52.12; H, 2.17; N, 45.65. Found: C, 52.53; H, 2.25; N, 45.12.

EXAMPLE VII

7-Amino-8,9-Dicyano-2,4-Dimethyl-Pyrrolo[b][1.2.4]Triazepine

A solution of 650 parts of 3,4-dicyano-1,2,5-triaminopyrrole, 405 parts of acetylacetone and 50 parts of p-toluenesulfonic acid in 945 parts of dimethylformamide is heated at 100° C. for 2 hours. During this time a crystalline solid separates. The mixture is cooled and the tan solid is collected, washed with a small amount of dimethylformamide and then thoroughly washed with ethanol; yield 610 parts (60%) of 7-amino-8,9-dicyano-2,4-dimethylpyrrolo[b][1.2.4]-triazepine, M.P. 273–279° C. (dec.). Recrystallization from acetic acid gives a product that melts at 278–280° C. (dec.).

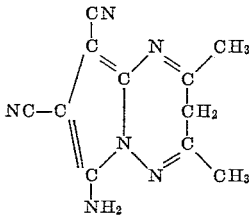

*Analysis.*—Calc'd. for $C_{11}H_{10}N_6$: C, 58.40; H, 4.42; N, 37.17. Found: C, 58.24, 58.33; H, 4.48, 4.58; N, 36.87, 36.88.

EXAMPLE VIII

7-Amino-8,9-Dicyano-2(4)-Hydroxy-4(2)-Methyl-pyrrolo[b][1.2.4]Triazepine

A solution of 65 parts of 3,4-dicyano-1,2,5-triaminopyrrole, 52 parts of ethyl acetoacetate and 5 parts of p-toluenesulfonic acid in 94 parts of dimethylformamide is heated at 100° C. for 4 hours and allowed to cool. The off-white solid which separates is collected and washed thoroughly with ethanol; yield, 32 parts (35%) of 7-amino - 8,9 - dicyano - 2(4)-hydroxy-4(2)-methylpyrrolo[b][1.2.4]-triazepine, M.P. >300° C. A sample recrystallized from dimethylformamide-ethanol shows the following analysis:

*Analysis.*—Calc'd. for $C_{10}H_8N_6O$: C, 52.63; H, 3.51; N, 36.84. Found: C, 52.38, 52.66; H, 3.74, 3.75; N, 37.53, 37.35.

When the dicarbonyl compounds indicated in Table I are reacted with 3,4-dicyano-1,2,5-triaminopyrrole in the manner of Example II above, the indicated pyrrolo-triazines and pyrrolotriazepines are obtained.

TABLE I

| Dicarbonyl Compound | Product |
|---|---|
| Phenylglyoxal | 6-amino-7,8-dicyano-2(3)-phenyl-pyrrolo[b]-as-triazine. |
| Cyclohexylglyoxal | 6-amino-2(3)-cyclohexyl-7,8-dicyanopyrrolo[b]-as-triazine. |
| Oxalyl chloride | 6-amino-2,3-dichloro-7,8-dicyano-pyrrolo[b]-as-triazine. |
| Oxalyl bromide | 6-amino-2,3-dibromo-7,8-dicyano-pyrrolo[b]-as-triazine. |
| Ethyl oxalyl chloride | 6-amino-2(3)-chloro-7,8-dicyano-3(2)-hydroxypyrrolo[b]-as-triazine. |
| Methyl phenylglyoxylate | 6-amino-7,8-dicyano-2(3)-hydroxy-3(2)-phenylpyrrolo[b]-as-triazine. |
| Ethyl 2-naphthalene-glyoxylate | 6-amino-7,8-dicyano-2(3)-hydroxy-3(2)-(2-naphthyl)pyrrolo[b]-as-triazine. |
| Ethyl phenylpyruvate | 6-amino-3(2)-benzyl-7,8-dicyano-2(3)-hydroxypyrrolo[b]-as-triazine. |
| Ethyl α-oxovalerate | 6-amino-7,8-dicyano-2(3)-hydroxy-3(2)-propylpyrrolo[b]-as-triazine. |
| Ethyl α-oxo-δ-phenyl-valerate | 6-amino-7,8-dicyano-2(3)-hydroxy-3(2)-(3-phenyl)propylpyrrolo[b]-as-triazine. |
| Malonaldehyde | 7-amino-8,9-dicyanopyrrolo[b]-[1.2.4]triazepine. |
| Benzoylacetone | 7-amino-8,9-dicyano-2(4)-methyl-4(2)-phenylpyrrolo[b][1.2.4]triazepine. |
| 3-formyl-2-butanone | 7-amino-8,9-dicyano-2(4),3-dimethylpyrrolo[b][1.2.4]-triazepine. |
| Malonyl chloride | 7-amino-2,4-dichloro-8,9-dicyano-pyrrolo[b][1.2.4]-triazepine. |
| Butylethylmalonyl | 7-amino-3-butyl-2,4-dichloro-8,9-dicyano-3-ethylpyrrolo[b][1.2.4]triazepine. |
| 7-ethyl-2,4-nonanedione | 7-amino-8,9-dicyano-4(2)-(3-ethyl)pentyl-2(4)-methylpyrrolo[b][1.2.4]triazepine. |
| 3-butyl-2,4-pentanedione | 7-amino-3-butyl-8,9-dicyano-2,4-dimethylpyrrolo[b][1.2.4]-triazepine. |
| 3-allyl-2,4-pentanedione | 3-allyl-7-amino-8,9-dicyano-2,4-dimethylpyrrolo[b][1.2.4]-triazepine. |
| 3-phenyl-2,4-pentanedione | 7-amino-8,9-dicyano-2,4-dimethyl-3-phenylpyrrolo[b][1.2.4]-triazepine. |
| Ethyl γ-phenylacetoacetate | 7-amino-4(2)-benzyl-8,9-dicyano-2(4)-hydroxypyrrolo[b]-[1.2.4]triazepine. |
| 4-pentene-2,3-dione | 6-amino-7,8-dicyano-2(3)-methyl-3(2)-vinylpyrrolo[b]-as-triazine. |
| 2-dodecene-4,6-dione | 7-amino-8,9-dicyano-2(4)-hexyl-4(2)-propenylpyrrolo[b][1.2.4]-triazepine. |
| 2,10-dimethyl-7-hendecene-4,5-dione | 6-amino-7,8-dicyano-2(3)-isobutyl-3(2)-(5-methyl-2-hexenyl(pyrrolo-[b]-as-triazine. |
| 2,12-dimethyl-8-tridecene-5,6-dione | 6-amino-7,8-dicyano-2(3)-isopentyl-3(2)-(6-methyl-2-heptenyl)pyrrolo-[b]-as-triazine. |
| 4-methyl-1,3-diphenyl-3-pentene-1,2-dione | 6-amino-7,8-dicyano-2(3)-phenyl-3(2)-(2-methyl-1-phenylpropenyl)-pyrrolo[b]-as-triazine. |
| 1-phenyl-3-(2,4,6-trimethylcyclo-hexyl)-1,3-propanedione | 7-amino-8,9-dicyano-2(4)-phenyl-4(2)-(2,4,6-trimethylcyclohexyl)-pyrrolo-[b][1.2.4]triazepine. |
| 1,7-diphenyl-1-heptene-3,5-dione | 7-amino-8,9-dicyano-2(4)-phenethyl-4(2)-styrylpyrrolo-[b][1.2.4]triazepine. |

As already mentioned, the 6-amino-7,8-dicyanopyrrolo[b]-as-triazines and the 7-amino-8,9-dicyanopyrrolo-[b][1.2.4]triazepines of the invention, as well as their N-alkylidene derivatives, find use as dyes or as intermediates for dyes. These dyes are of value in dyeing a variety of fabrics including nylon, wool, cellulose acetate and the like. The following is illustrative, but in no way limitative, of how the colored compounds of the invention can be employed as dyes: To 5000 parts of boiling water there is added a solution of 2 parts of highly purified, partially desulfonated sodium lignosulfonate ("Marasperse" CB) in 2000 parts of water and about 250 parts of 10% acetic acid. A solution of 2 parts of 6-amino-7,8-dicyano-2,3-diphenylpyrrolo[b]-as-triazine, prepared as in Example II in 190 parts of dimethylformamide, is added with stirring. Cloth samples of cellulose acetate, 66 nylon, and wool, weighing 10 parts each, are added and the mixture is heated at 100° C. for 20 minutes. The cloth samples are then washed thoroughly with water and dried. All three fabrics are dyed magenta by this process.

The foregoing detailed description has been given for clearness of understanding only and no unnecessary limitations are to be understood therefrom. The invention is not limited to the exact details shown and described for obvious modifications will occur to those skilled in the art.

I claim:

1. A compound of the class consisting of those represented by the following formula and their N-alkylidene derivatives:

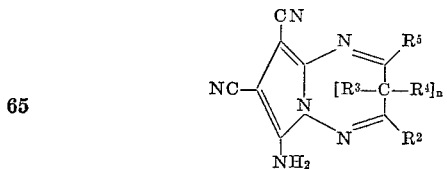

wherein $R^2$ is a member of the group consisting of hydrogen, aliphatically saturated hydrocarbyl of up to 20 carbon atoms, aliphatically monounsaturated hydrocarbyl of up to 20 carbon atoms, and halogen, $R^5$ is a member of the group consisting of hydrogen, aliphatically saturated hydrocarbyl of up to 20 carbon atoms, aliphatically monounsaturated hydrocarbyl of up to 20 carbon atoms, hydroxy and halogen, $R^3$ and $R^4$ are members of the class consisting of hydrogen, aliphatically saturated hydrocarbyl of up to 20 carbon atoms, and aliphatically monounsaturated hydrocarbyl of up to 20 carbon atoms, and $n$ is a cardinal number of 0 to 1.

2. Process for preparing the compounds represented by the formula shown in claim 1 which comprises reacting at a temperature of from 0 to 300° C. 3,4-dicyano-1,2,5-triaminopyrrole with a dicarbonyl compound of the formula

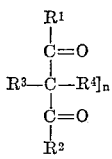

wherein $R^1$ is a member of the group consisting of hydrogen, aliphatically saturated hydrocarbyl of up to 20 carbon atoms, aliphatically monounsaturated hydrocarbyl of up to 20 carbon atom, aliphatically saturated hydrocarbyloxy of up to 20 carbon atoms, aliphatically monounsaturated hydrocarbyloxy of up to 20 carbon atoms, and halogen, $R^2$ is a member of the group consisting of hydrogen, halogen, aliphatically saturated hydrocarbyl of up to 20 carbon atoms and aliphatically monounsaturated hydrocarbyl of up to 20 carbon atoms, and $R^3$ and $R^4$ represent members of the class consisting of hydrogen, aliphatically saturated hydrocarbyl of up to 20 carbon atoms, and aliphatically monounsaturated hydrocarbyl of up to 20 carbon atoms and $n$ is a cardinal number of 0 to 1.

3. Process for preparing 6-amino-7,8-dicyanopyrrolo-[b]-as-triazines which comprises reacting at a temperature of from 0° to 300° C. 3,4-dicyano-1,2,5-triaminopyrrole with vicinal dicarbonyl compounds of the formula

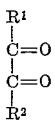

wherein $R^1$ is a member of the group consisting of hydrogen, aliphatically saturated hydrocarbyl of up to 20 carbon atoms, aliphatically monounsaturated hydrocarbyl of up to 20 carbon atoms, aliphatically saturated hydrocarbyloxy of up to 20 carbon atoms, aliphatically monounsaturated hydrocarbyloxy of up to 20 carbon atoms and halogen, and $R^2$ is a member of the group consisting of hydrogen, halogen, aliphatically saturated hydrocarbyl of up to 20 carbon atoms and aliphatically monounsaturated hydrocarbyl of up to 20 carbon atoms.

4. Process for preparing 7-amino-8,9-dicyanopyrrolo-[b][1.2.4]triazepines which comprises reacting at a temperature of from 0° to 300° C. 3,4-dicyano-1,2,5-triaminopyrrole with 1,3-dicarbonyl compounds of the formula

wherein $R^1$ is a member of the group consisting of hydrogen, aliphatically saturated hydrocarbyl of up to 20 carbon atoms, aliphatically monounsaturated hydrocarbyl of up to 20 carbon atoms, aliphatically saturated hydrocarbyloxy of up to 20 carbon atoms, aliphatically monounsaturated hydrocarbyloxy of up to 20 carbon atoms and halogen, $R^2$ is a member of the group consisting of hydrogen, halogen, aliphatically saturated hydrocarbyl of up to 20 carbon atoms and aliphatically monounsaturated hydrocarbyl of up to 20 carbon atoms, and $R^3$ and $R^4$ represent members of the class consisting of hydrogen, aliphatically saturated hydrocarbyl of up to 20 carbon atoms and aliphatically monounsaturated hydrocarbyl of up to 20 carbon atoms.

5. 6 - amino - 7,8 - dicyano - 2,3 - dimethylpyrrolo[b]-as triazine.

6. 6 - amino - 7,8 - dicyano - 2,3 - diphenylpyrrolo[b]-as-triazine.

7. 6 - amino - 7,8 - dicyano - 2(3) - hydroxy - 3(2)-methylpyrrolo[b]-as-triazine.

8. 6 - benzalamino - 7,8 - dicyano - 2,3 - dimethylpyrrolo[b]-as-triazine.

9. 6 - benzalamino - 7,8 - dicyano - 2,3 - diphenylpyrrolo[b]-as-triazine.

10. 6-amino-7,8-dicyanopyrrolo[b]-as-triazine.

11. 7 - amino - 8,9 - dicyano - 2,4 - dimethylpyrrolo[b]-[1.2.4]triazepine.

12. 7 - amino - 8,9 - dicyano - 2(4) - hydroxy - 4(2)-methylpyrrolo[b][1.2.4]triazepine.

References Cited in the file of this patent
UNITED STATES PATENTS 2,961,447     Middleton _____ Nov. 22, 1960

OTHER REFERENCES

Erickson et al.: "The 1,2,3 and 1,2,4-Triazines, Tetrazines and Pentazines," page 132, Interscience Publishers, Inc. (1956), QD 401 E7.

Grob et al.: Helv. Chim. Acta, volume 33, pages 273–275, 278 and 281–5 (1950), QD 1 H4.

Grob et al.: Helv. Chim. Acta, volume 33, pages 658–666 (1950), QD 1 H4.

Hoggarth, J. Chem. Soc., 1950, pages 614–617 (1950), QD 1 C6.

UNITED STATES PATENT OFFICE
CERTIFICATE OF CORRECTION

Patent No. 3,121,081                                      February 11, 1964

Clifford Lee Dickinson, Jr.

It is hereby certified that error appears in the above numbered patent requiring correction and that the said Letters Patent should read as corrected below.

Column 7, lines 11 to 17, the formula should appear as shown below instead of as in the patent:

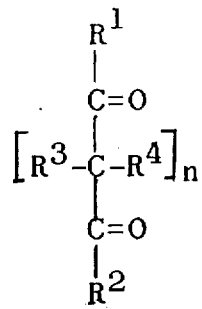

Column 8, lines 3 to 9, the formula should appear as shown below instead of as in the patent:

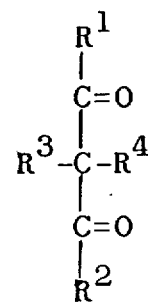

Signed and sealed this 30th day of June 1964.

(SEAL)
Attest:

ERNEST W. SWIDER                                   EDWARD    J.    BRENNER

Attesting Officer                                     Commissioner of Patents